United States Patent [19]  [11]  4,297,452
De Koch et al.  [45]  Oct. 27, 1981

[54] PROCESS FOR THE MANUFACTURE OF OXAZOLINE AND/OR OXAZINE-MODIFIED ADSORBENT POLYMER RESINS

[75] Inventors: Robert J. De Koch, Wausau, Wis.; Gerald C. Kolb, Bay City; James W. Lalk, Shepherd, both of Mich.

[73] Assignee: The Dow Chemical Company, Midland, Mich.

[21] Appl. No.: 109,729

[22] Filed: Jan. 4, 1980

[51] Int. Cl.$^3$ ............................. C08F 8/20; C08F 8/24
[52] U.S. Cl. ................................... 525/367; 525/357; 525/369; 525/375; 525/540
[58] Field of Search ............... 525/369, 375, 540, 359, 525/367, 357

[56] References Cited

U.S. PATENT DOCUMENTS 4,009,326  2/1977  Hort .................................... 525/367
4,143,100  3/1979  Schulz et al. ....................... 525/367

OTHER PUBLICATIONS

Angew, Chem. Internat. Edit., vol. 5 (1966), No. 10, pp. 875 & 881, by Selliger et al.
Graft Copolymerization of 2-Methyl-2-Oxazoline Macromolecules, vol. 8, No. 4, pp. 390–396, Saegusa et al., Jul. 1975.

Primary Examiner—William F. Hamrock
Attorney, Agent, or Firm—Michael L. Glenn; Charles J. Enright

[57] ABSTRACT

A novel process is disclosed for increasing the amount of grafted polymer formed during the production of polyamide-modified macroporous polystyrene/divinylbenzene cross-linked beads. Greater selectivity for oxazolination and/or oxazination (grafting) of the chloromethylated polystyrene (CMPS) beads over homopolymer formation is achieved by forming an iodized cross-linked vinyl-addition polymer which is then contacted with an excess of oxazoline or oxazine until up to about 50 percent of said oxazoline or oxazine monomer is reacted. Subsequent hydrolysis of these polyamide-modified resins produces polyamine anion-exchange resins which exhibit greater than 2 times the weak base capacities of conventional anion-exchange resins.

8 Claims, No Drawings

PROCESS FOR THE MANUFACTURE OF OXAZOLINE AND/OR OXAZINE-MODIFIED ADSORBENT POLYMER RESINS

BACKGROUND OF THE INVENTION

Reported processes for the graft polymerization of 2-alkyl-2-oxazoline on CMPS beads indicate a maximum selectivity to graft polymer over homopolymer formation of 70 percent. Obviously, it would be desirable to divert the 30 or higher percent of the consumed alkyl oxazoline to graft polymer rather than to oxazoline homopolymer which is a waste material. Thus, it would be desirable to improve the selectivity to graft polymer. It would also be desirable to prevent the polymerization of the unreacted oxazoline so that it can be recycled and reused, if desired.

SUMMARY OF THE INVENTION

An improved process for the preparation of adsorbent, graft copolymer resins is disclosed. A liquid-permeable, water-insoluble, synthetic resinous body, capable of removing absorbed materials from liquid solutions passing therethrough, comprises a cross-linked vinyl-addition polymer whose backbone contains a plurality of units corresponding to the formula

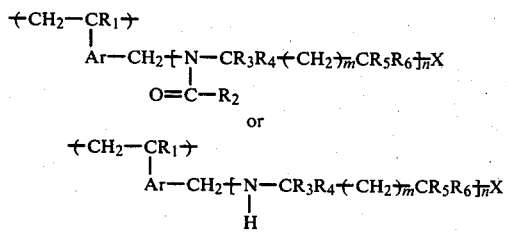

wherein:
- $R_1$ is hydrogen or methyl (preferably hydrogen);
- $R_2$ is hydrogen, phenyl or alkyl of from 1 to about 24 carbon atoms (preferably alkyl and most preferably methyl);
- $R_3$-$R_6$ are each independently hydrogen, lower alkyl of hydroxy-substituted lower alkyl, with the proviso that at least two of $R_3$-$R_6$ are hydrogen;
- Ar is a carbocyclic aromatic nucleus (preferably a benzene nucleus);
- m is 0 or 1 (preferably 0);
- n is an integer of at least 1 (preferably from 1 to about 10, and most preferably from 1 to 5); and
- X is Cl, Br, I or OH.

Usually the copolymer contains 5–90 percent polymeric units represented by formula I and from 10–95 percent polymeric units represented by formula II. The improved method for preparing the copolymer resins described above comprises the steps of (A) reacting an iodide ion with a cross-linked vinyl-addition polymer whose backbone contains a plurality of units corresponding to the formula $$+CH_2-CR_1+$$
$$|$$
$$Ar-CH_2Y$$

wherein:
- $R_1$ is hydrogen or methyl,

Ar is a carbocyclic aromatic nucleus, and Y is chloro or bromo, thereby forming an iodized cross-linked vinyl-addition polymer, (B) contacting the iodized cross-linked vinyl-addition polymer of step (A) with an excess of oxazoline or oxazine monomer until from a trace amount to about 50 percent of the total oxazoline or oxazine monomer is reacted thereby grafting the oxazoline or oxazine monomer onto the iodized cross-linked vinyl-addition polymer, said oxazoline or oxazine is of the formula

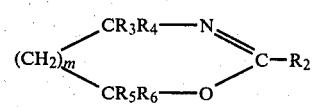

wherein:
- $R_2$ is hydrogen, phenyl or alkyl of from 1 to about 24 carbon atoms;
- $R_3$-$R_6$ are each independently hydrogen, lower alkyl or hydroxy-substituted lower alkyl, with the proviso that at least two of $R_3$-$R_6$ are hydrogen;
- m is 0 or 1; and (C) hydrolyzing the grafted cross-linked vinyl-addition polymer of step (B) with an excess of an aqueous acid or base solution thereby producing a synthetic resinous body of formula I and II.

DETAILED DESCRIPTION OF THE INVENTION

High capacity weak base resins are conveniently prepared by reacting a cross-linked poly(vinylaromatic) resin bearing a plurality of ar-halomethyl groups with an oxazoline or oxazine and hydrolyzing the resulting grafted cross-linked vinyl-addition polymer with an excess of aqueous acid or base solution.

The poly(vinylaromatic) resins suitable for use as reactants in making the instant graft copolymers are a known class of polymers whose structures comprise a plurality of units corresponding to the formula $$+CH_2-CR+ \qquad III$$
$$|$$
$$Ar-CH_2Y$$

wherein R and Ar have the aforesaid meaning and Y is chloro, bromo or iodo. Such polymers are normally solid, benzene-insoluble interpolymers and have been used extensively as the polymer matrix in ion-exchange resins. They have been typically prepared by (1) halomethylating (e.g., chloromethylating) a cross-linked or cross-linkable poly(vinylaromatic) resin or by (2) interpolymerizing a halomethylated vinylaromatic monomer with suitable cross-linking agents. The cross-linked resins in each of (1) and (2) are produced by conventional polymerization techniques using, typically, from about 0.5 to about 40 weight percent of cross-linker (preferably from about 0.5 to about 20 weight percent cross-linker). Suspension-polymerization techniques are particularly useful in forming cross-linked micro- or macro-reticular beads (alternatively referred to in the literature as micro- or macroporous beads).

Halomethylated polymers produced by procedure (1) above are illustrated, for example, by U.S. Pat. Nos.

2,614,099; 3,549,562 and U.S. Pat. Re 27,026 (the disclosures of which are incorporated by reference). Such polymers bear an average of from about 0.2 to about 1.5 halomethyl groups per aromatic nucleus and are, of course, quite satisfactory as reactants in preparing the instant graft copolymers.

Illustrative of this class of halomethylated polymers are polymers of vinylaromatic compounds (e.g., styrene, α-methylstyrene, α-chlorostyrene, vinyltoluene, vinylnaphthalene, and the like, and interpolymers thereof) cross-linked with polyvinyl aromatic compounds (e.g., divinylbenzene, trivinylbenzene, divinyltoluene, divinylxylene, divinylnaphthalene, and the like, and mixtures thereof) which have been subsequently halomethylated using conventional techniques, e.g., by reacting the polymers with formaldehyde and HCl or HBr, or by reacting the polymers with chloromethyl methyl ether, etc.

Halomethylated polymers produced by procedure (2) above are illustrated, for example, by U.S. Pat. No. 3,843,566 (the disclosure of which is incorporated herein by reference); such polymers are likewise satisfactory as reactants in preparing the instant graft copolymers. Illustrative of polymers in this regard are the polymers of ar-vinylbenzyl chloride cross-linked with divinylbenzene, as described in U.S. Pat. No. 3,843,566.

The chloromethylated poly(vinylaromatic) polymers are the most commercially available and are, therefore, preferred reactants. The most preferred reactants are the products of chloromethylated polystyrenes cross-linked with divinylbenzene.

The physical form of the halomethylated vinylaromatic polymers above may be varied to convenience. For, example, the polymer may be in the form of a film (i.e., a permeable membrane), fibers, porous particles, beads, etc. Of these, the porous beads are the preferred embodiments and the macroporous beads are the most preferred embodiment. Methods of preparing such halomethylated vinylaromatic polymers as macroporous beads are described, for example, in U.S. Pat. Nos. 3,549,562; 3,843,566 and U.S. Pat. No. RE 27,026.

The oxazoline and oxazine reactants used herein are likewise a known class of compounds which are represented by the formula

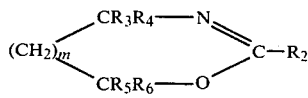

wherein:
R$_2$ is hydrogen, phenyl or alkyl of from 1 to about 24 carbon atoms (preferably alkyl and most preferably methyl or ethyl);
R$_3$–R$_6$ are each independently hydrogen, lower alkyl or hydroxy-substituted lower alkyl (preferably hydrogen, methyl, ethyl or hydroxymethyl, most preferably hydrogen), with the proviso that at least two of R$_3$–R$_6$ are hydrogen; and
m is 0 or 1, preferably 0.

The oxazoline reactants are currently preferred over the oxazine reactants, due to commercial availability. The most preferred reactant is 2-methyl-2-oxazoline.

The instant process for preparing the graft copolymer adsorbent resins described herein comprises contacting the vinylaromatic polymer (III) with an iodide ion at a temperature sufficient to produce a convenient rate of reaction. This reaction is facilitated by conducting it in a liquid reaction medium which dissolves the iodide ion. The resulting partially iodinated vinyl-aromatic polymer is then washed with unused portions of solvent. The iodine added to the vinylaromatic polymer in this initial step serves as a catalyst in the subsequent oxazolination reaction. The amount of iodide ion to alkyl halide ion in the vinylaromatic polymer may vary from 0.10 percent up to about 10.0 percent based on the total weight of reactants; however, lesser or greater amounts could be employed. Complete elimination of iodine results in substantial increases in the oxazolination reaction time. Suitable solvents to be used for the liquid reaction medium and product washing include methanol, perchloroethylene, cyclohexane, petroleum distillates, benzene, toluene, xylene, and other like hydrocarbons. Methanol is the current solvent of choice for producing and washing the iodinated vinyl-aromatic polymers. In such liquid reaction media, convenient reaction rates have been observed at temperatures from about 40° C. to about 150° C. depending upon the reflux temperature of the solvent.

Following the partial iodination of the vinyl-aromatic polymer, the resulting iodinated vinylaromatic polymer is contacted with the oxazine or oxazoline (IV) at a temperature sufficient to produce a convenient rate of reaction. This reaction is facilitated by conducting it in a liquid reaction medium which dissolves IV and is preferably conducted in a reaction medium which dissolves IV, swells III and is a poor or non-solvent for polyoxazolines or polyoxazines. Suitable such liquid reaction media include perchloroethylene, cyclohexane, petroleum distillates, benzene, toluene, xylene, and other like hydrocarbons. Perchloroethylene is the current solvent of choice. In such liquid reaction media, convenient reaction rates have been observed at temperatures of from about 80° C. to about 125° C. The ratio of III to IV in the process can be varied but it is important in the instant process to have an excess of IV; most preferably from about 1 to about 24 equivalents of IV per ar-halomethyl equivalent in the polymer. The reaction is stopped when a trace amount up to about 50 percent of IV has reacted. It is observed that a minimum amount of homopolymer is produced when the reaction is stopped at this point. Subsequently, the grafted copolymer resin is separated from the reaction mixture and the solvent containing excess IV is recycled or discharged at the user's convenience.

The resulting grafted, cross-linked, vinyl-addition copolymer resins are hydrolyzed with an excess of an aqueous acid or base solution thereby producing an adsorbent synthetic resinous body of formula I and II.

The invention will be further described with respect to the following examples; however, the scope of the invention is not to be limited thereby.

Example 1—Adsorbent Resin Preparation

Conventional macroporous cross-linked polystyrene beads are prepared by suspension polymerization of styrene (51.7 parts by weight) and divinylbenzene (3.3 parts by weight) in a hydrocarbon diluent (45 parts by weight). The beads are substantially chloromethylated using chloromethyl methyl ether. The chloromethylated beads contain an average of from about 0.8 to 1.0 chloromethyl groups per aromatic nucleus.

An aliquot (30.1 g) of conventionally prepared chloromethylated polystyrene (CMPS) beads, containing 46.2 weight percent water, is rinsed with several volumes of methanol, is filtered from the methanol rinse and is charged to a 500 ml, 3-neck, round bottom flask equipped with a stirrer and condenser. Potassium iodide (1.66 g) in 200 ml of methanol is added to the flask to form a slurry. The slurry is heated to reflux (65° C.) with stirring, maintained at that temperature for 1 hour and cooled. The resulting solid, partially iodinated CMPS (I-CMPS) resin is filtered and rinsed with methanol.

The I-CMPS resin is charged to a 1000 ml, 3-neck, round bottom flask equipped with a stirrer, Dean Stark trap and condenser. Perchloroethylene (300 ml) is added to the I-CMPS and the resulting mixture is stirred for 30 minutes to about an hour at room temperature (about 23° C.) to swell the resin matrix. The perchloroethylene/I-CMPS mixture is heated to reflux ($\sim$120° C.) and the system is dried by a perchloroethylene/water azeotrope. After the reaction mixture is thoroughly dried, freshly distilled 2-methyl-2-oxazoline (139 g) is added and the resulting slurry is heated at reflux (121° C.) for 5 to 6 hours. The graft copolymer is collected by filtration and washed with several volumes of methanol and deionized water. The wet graft copolymer resin (1500 g) has an average polymer tail length of around 6.9. Analysis of the perchloroethylene filtrate by vapor phase chromatography indicated that 53.3 percent of the oxazoline reactant is consumed. Selectivity to grafted polyoxazoline is approximately 90 percent as measured by resin weight gain divided by the total weight of oxazoline consumed, multiplied by 100.

The wet graft copolymer resin ($\sim$60 g) is charged to a 500 ml, 3-neck flask equipped with a stirrer and condenser. Hydrochloric acid (3 N, 367 ml) is added and the mixture is refluxed with stirring at 100° C. for 6 hours. The resulting product is collected by filtration and washed with several volumes of deionized water. Analysis of the final product reveals 67.3 percent hydrolysis, 38.4 percent solids and a weak base capacity (WBC) of approximately 1.8 meq/ml. The hydrolyzed, adsorbent graft copolymer resins of this invention are hereinafter referred to as "polyamine".

MEASUREMENT OF WEAK BASE CAPACITY

Weak base capacity (WBC) is a static measure of the amount of primary, secondary and tertiary amine present in an amine functionalized resin. In general, the resin is first washed with dilute (5 percent) HCl to put all nitrogen functionality in the hydrochloride form and then excess HCl is removed by washing with 0.001 N HCl. This very dilute 0.001 N HCl is used for washing so as not to hydrolyze any of the hydrochloride amine salts. Ammonia is used to selectively strip the Cl− ion from primary, secondary and tertiary amine.

All weak base capacity measurements, for this invention, are performed by weighing approximately 5 grams of wet resin beads into a 60 ml coarse, fritted glass funnel. The beads are washed with 500 ml of 5 percent HCl followed by a 500 ml wash with 0.001 N HCl. A 50 ml portion of 5.0 N NH$_4$OH is poured over the beads and the funnel stoppered. After 15 minutes the stopper is removed, the filtrate is collected in a beaker and the resin is washed with 100 ml of deionized water, which is collected in the same beaker. The pH of the resulting solution is adjusted to a pH below 3.0 with dilute HNO$_3$, and the solution is titrated to an end point with 0.1 N AgNO$_3$ on a Precision-Dow Recordomatic Potentiometric Titrator.

$$WBC = \frac{(\text{Normality AgNO}_3)(\text{ml AgNO}_3)}{(\text{gms Wet Resins})} = \frac{meq}{\text{wet gm}}$$

The following table compiles static weak base capacity measurements as a function of "n", the resin tail length. A WBC for DOWEX ® MWA-1, a commercial anion-exchange resin of The Dow Chemical Company, is included for reference.

| Resin | "n" | WBC (HCl form) Meq/Dry gm |
|---|---|---|
| DOWEX ® MWA-1 | — | 3.3 |
| Polyamine | 6.9 | 6.5 |

Polyamine resin capacities for HCl are also determined in dynamic column experiments where an aqueous HCl solution of known concentration is passed through a fixed bed of weak base resin at constant flow rate. Water quality of the column effluent is monitored continuously by conductivity measurements, and HCl breakthrough is defined at the point where effluent conductivity reached 25 $\mu$mhos. Resin loading (L) under these dynamic conditions is determined by the following relationship:

L(meq/ml)=(Bed Volume HCl to Breakthrough)×[HCl](m/l)

The following table compiles dynamic column HCl capacity data for the high weak base polyamine resin of this invention as compared to a conventional anion-exchange system.

| Resin | L (meq/ml) |
|---|---|
| Polyamine ($\sim$7-tail) | 2.2 |
| DOWEX ® MWA-1 | 1.0 |

Thus, both static and dynamic weak base capacity measurements are determined. In each instance, the weak base capacity of the resin of this invention is demonstrably 2 to 3 times greater than the weak base capacities of conventional anion-exchange resins. In practice, this means greater adsorption capacity of the resin for color bodies, metal ions, or the like.

EXAMPLE 2-3

Following the procedures set forth in Example, 1, 2-methyl-2-oxazoline is reacted with a partially iodinated chloromethylated, macroporous poly(styrene-DVB) bead bearing an average of from about 0.8 to about 0.9 chloromethyl groups per aromatic nucleus. Varying ratios of 2-methyl-2-oxazoline equivalents to chloromethyl equivalents are used and the final products contain greater than 80 weight percent of oxazoline in chemically combined form, see Table I below.

TABLE I

| Example No. | Oxazoline-—CH$_2$Cl groups (mole ratio) | Grafting Reaction time (hours) | Approximate Tail Lengths | % Selectivity to Graft Polymer |
|---|---|---|---|---|
|   |   | 2 | 2.0 | 98.0 |
| 2 | 8/1 | 4 | 3.0 | 89.0 |
|   |   | 8 | 5.6 | 80.0 |
|   |   | 2 | 3.0 | 94.0 |
| 3 | 24/1 | 4 | 4.0 | 95.0 |

TABLE I-continued

| Example No. | Oxazoline-—CH₂Cl groups (mole ratio) | Grafting Reaction time (hours) | Approximate Tail Lengths | % Selectivity to Graft Polymer |
|---|---|---|---|---|
|  |  | 5-6 | 7.0 | 92.0 |
|  |  | 8 | 11.0 | 91.0 |

In each instance, when the grafting reaction is stopped, the reaction mixture is cooled, the resin is filtered and the solvent containing excess oxazoline is recycled for future oxazolinations. Mass balance measurements are as follows for the 7 tail resin product, in Example 3, resulting from a 5-6 hour reaction of a 24/1 initial charge of oxazoline equivalent to CMPS equivalent:

6.3 moles of oxazoline consumed
17.7 moles of oxazoline unreacted
5.8 moles of oxazoline on bead
0.5 moles of extractable oxazoline by-products (homopolymer)

The data in Table I support the following conclusions when viewed from the point of making a graft copolymer having optimum selectivity to adsorbent graft polymer resin with a minimum amount of oxazoline homopolymer or waste material:

a. the greater the excess of 2-methyl-2-oxazoline the greater the selectivity to graft polymer;
b. a ratio of 24 oxazoline equivalents per CMPS equivalent is preferred; and
c. the selectivity to graft polymer decreases as the reaction time increases.

EXAMPLES 4-6—ADSORPTION CAPACITY

In like manner, hydrolyzed graft copolymer resins are prepared from a cross-linked polystyrene having a DVB/diluent ratio of 6/45 as in Example 1. The hydrolyzed graft copolymers are evaluated for their adsorption qualities as explained below. The results are summarized in Table II below.

The measurement of "capacity" is a measure of effectiveness in removing color bodies, metal ions or other solutes from a liquid solution or suspension. An aliquot of a solution or suspension containing a known concentration of material to be adsorbed is prepared and adjusted to a pH of approximately 7.0. Various weights of the absorbent resin are placed in sealable bottles. A constant amount of the solution or suspension containing material to be adsorbed is added to each sealable bottle containing the adsorbent resin and agitated for 24 hours at room temperature. The color or unadsorbed material remaining in the liquor over the adsorbent resin beads is then determined spectrophotometrically. This data is then plotted in a Freundlich isotherm using as the coordinates:

y-axis: log (loading or mass of substance sorbed per meter³ of sorbent resin)
x-axis: log (equilibrium solute concentration)

This allows the calculation of adsorption capacity (a) by extrapolation of a value for the x-axis and y-axis which would be equal to the initial concentration of the substance to be adsorbed when the plot of said x and y values is a straight line. The mathematical formula used in the above calculation is:

$$(a) = \text{Log}\left[\Delta(\text{ppm substance}) \times \frac{\text{mass of substance sorbed}}{m^3 \text{ resin}}\right]$$

where Δ(ppm substance) is the difference in the solute concentration between the treated and untreated liquors. The antilog (a) when x is 3 is taken as the capacity of the resin.

Table II shows bromophenol blue capacities, 2,4-dinitro-o-sec-butylphenol (DINOSEB) capacities and metal chelation capacities for the adsorbent graft copolymer resins of this invention as compared to a commercially available DOWEX ® MWA-1 resin. In Example 6, the polyamine resin is used in the free base form and the metal solution is adjusted to a pH of about 2.0.

TABLE II

Resin Adsorption Capacity at Room Temperature (~23° C.)

| Ex. No. | Solute or Color Body | WBC meq/dry g | Resin | Capacity meq/g | |
|---|---|---|---|---|---|
| 4 | Bromphenol blue | 8.0<br>3.3 | Polyamine<br>*DOWEX ® MWA-1 | 1200<br>560 | |
| 5 | DINOSEB | 8.0<br>3.3 | Polyamine<br>*DOWEX ® MWA-1 | 1200<br>560 | |
|  |  |  |  | Cu²⁺ | UO²⁺ |
| 6 | Copper (Cu²⁺) and Uranyl (UO²⁺) ions | 7.5<br>3.3 | Polyamine<br>*DOWEX ® MWA-1 | 175<br>~0 | 670<br>265 |

The above examples illustrate the greater adsorption capacity of the resins of the instant invention which is also in correlation with the higher weak base capacity of the instant resins over the weak base capacities of conventional anion-exchange resins.

What is claimed is:

1. In a process for graft polymerizing (i) an oxazoline or oxazine monomer corresponding to the formula

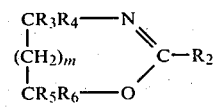

wherein:
R₂ is hydrogen, phenyl or alkyl of from 1 to about 24 carbon atoms;
R₃–R₆ are each independently hydrogen, lower alkyl or hydroxy-substituted lower alkyl, with the proviso that at least two of R₃–R₆ are hydrogen;
m is 0 or 1;

with (ii) a cross-linked, vinyl-addition polymer the backbone of which contains a plurality of units corresponding to the formula

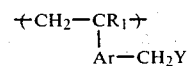

wherein:
R₁ is hydrogen or methyl,
Ar is a carbocyclic aromatic nucleus, and
Y is chloro or bromo;

in an inert liquid reaction medium which dissolves the oxazoline or oxazine reactant, the improvement comprising the sequential steps of:

(A) contacting at reactive conditions the vinyl-addition polymer with a source of iodide ions, so as to introduce sufficient iodo moieties into the polymer to catalyze reaction of the polymer with the oxazoline or oxazine moiety; and (B) contacting at reactive conditions the iodized cross-linked, vinyl-addition polymer of step (A) with from about 8 to about 24 equivalents of the oxazoline or oxazine monomer for each equivalent of halomethyl moieties borne by the polymer, so as to react up to about 50 percent of the total oxazoline or oxazine monomer present.

2. The process defined by claim 1 wherein said reaction medium swells, but does not dissolve, said cross-linked vinyl-addition polymer and is a poor or non-solvent for polyoxazolines or polyoxazines.

3. The process defined by claim 2 wherein said reaction medium for step (B) is perchloroethylene.

4. The process defined by claim 10 wherein said iodide is potassium iodide.

5. The process defined by claim 2 wherein said oxazoline is 2-methyl-2-oxazoline.

6. The process defined by claim 3 wherein the step (B) is conducted at a reaction temperature of about 120° C.

7. The process defined by claim 6 wherein from about 0.1 to about 10 percent of the halomethyl groups borne by the iodized, cross-linked, vinyl-addition polymer are iodomethyl moieties.

8. The process defined by claim 7 wherein the mole equivalent of oxazoline or oxazine monomer to the iodized cross-linked, vinyl addition polymer is 24 to 1.

* * * * *

UNITED STATES PATENT AND TRADEMARK OFFICE
CERTIFICATE OF CORRECTION

PATENT NO. : 4,297,452

DATED : October 27, 1981

INVENTOR(S) : Robert J. De Koch, Gerald C. Kolb, James W. Lalk

It is certified that error appears in the above—identified patent and that said Letters Patent is hereby corrected as shown below:

Col. 6, line 48, "EXAMPLE" should read -- EXAMPLES --.

Col. 6, line 49, "Example," should read -- Example --.

Col. 7, line 50, "absorbent" should read -- adsorbent --.

Col. 8, line 34, omitted footnote below Table II should read -- For comparison purposes only, not an example of this invention --.

Signed and Sealed this

Eighteenth Day of May 1982

[SEAL]

Attest:

Attesting Officer

GERALD J. MOSSINGHOFF

Commissioner of Patents and Trademarks